April 29, 1930.  C. L. FOUTZ  1,756,059

METHOD AND APPARATUS FOR PLYING UP RUBBER

Filed March 6, 1924  2 Sheets-Sheet 1

Inventor
Charles L. Foutz
By his Attorney
Ernest Hopkinson

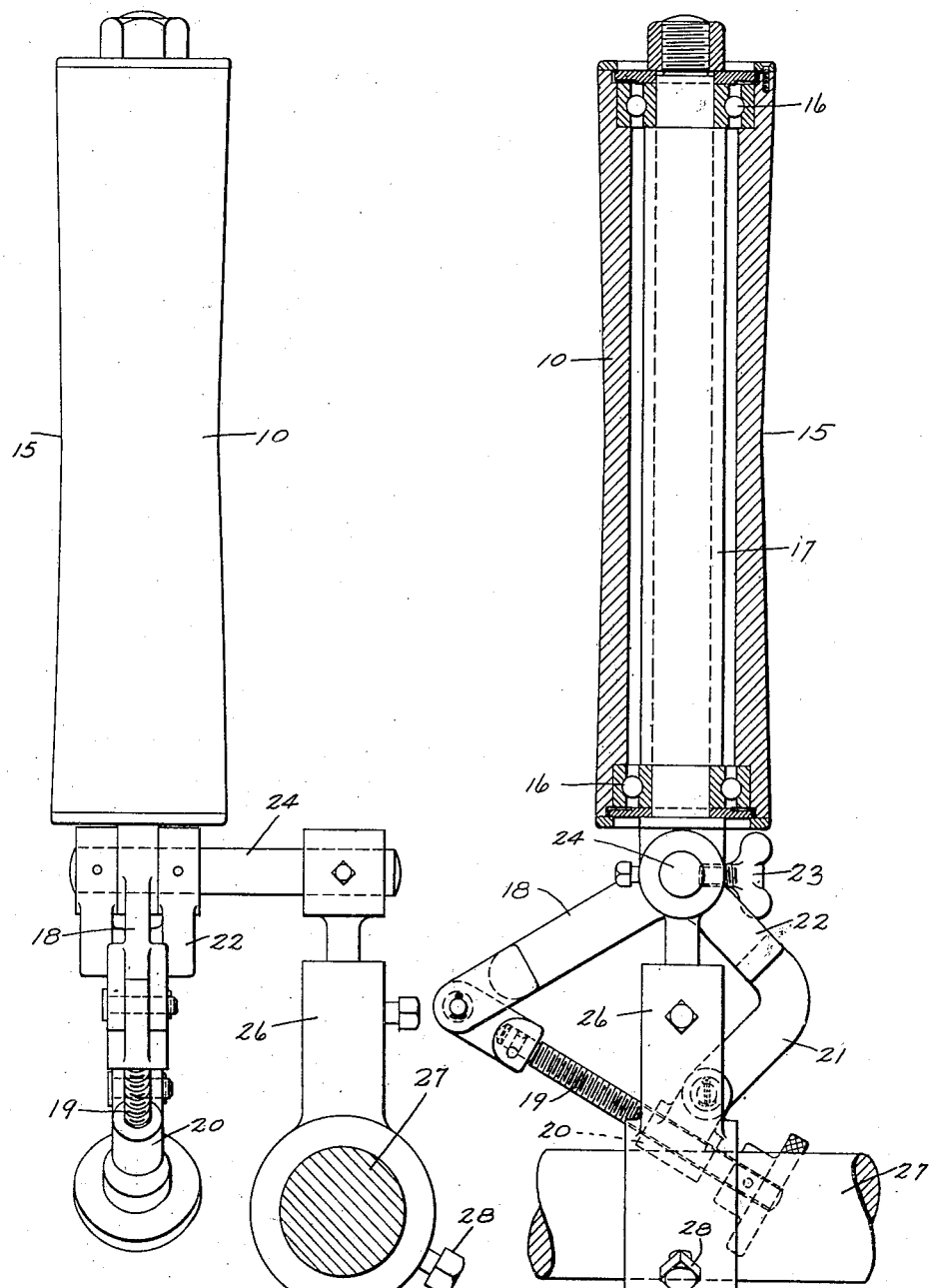

Patented Apr. 29, 1930

1,756,059

UNITED STATES PATENT OFFICE

CHARLES L. FOUTZ, OF INDIANAPOLIS, INDIANA, ASSIGNOR TO G & J TIRE COMPANY, OF INDIANAPOLIS, INDIANA, A CORPORATION OF INDIANA

METHOD AND APPARATUS FOR PLYING UP RUBBER

Application filed March 6, 1924. Serial No. 697,186.

This invention relates to rubber manufacture, and more specifically, a method and apparatus for plying up rubber composition.

It is desirable in connection with the manufacture of rubber articles in general, and in particular the manufacture of inner tubes, to obtain a plied up stock consisting of superimposed strips or laminations of rubber. While this may be done manually by snipping off strips of stock into short lengths, capable of being manipulated, such a manual procedure involves a great deal of labor and is expensive. The present invention contemplates a method and apparatus for doing this continuously, and preferably employs a calender, cutters, and a deflector or guide so arranged and located as to permit of continuously cutting the sheet of rubber into strips and simultaneously superimposing one upon another in unison with the continuous formation of the rubber into a sheet. The invention provides a rapid, efficient and economical process for obtaining plied stock, and may be carried on with simple and inexpensive appliances in working relation with a calender, with which all rubber factories are equipped.

An embodiment of the invention is illustrated in the accompanying drawings, in which:—

Figure 3 is a cross-section through a deflecting and guiding roller in its preferred form;

Figure 1:
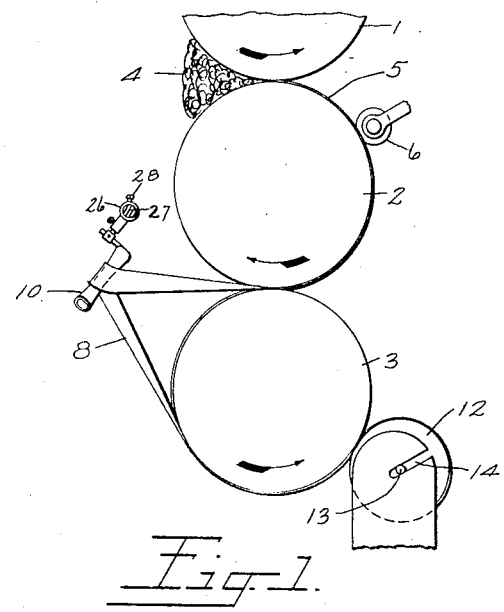
Figures 1 and 2 are diagrammatic side and front elevations, respectively, of a calender equipped with trimming knives and a deflector for carrying on the process.
Figure 2:
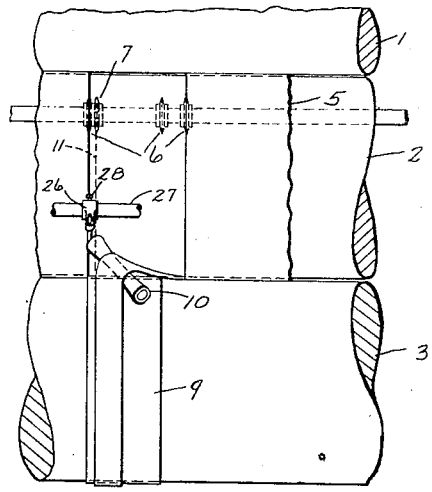

And Figure 4 is a side elevation of one of the adjustments for the deflecting and guiding roller.

While the process may be practiced with any suitable and convenient form of apparatus, a calender of the usual form, having a vertical stack of driven rolls 1, 2 and 3, is preferably employed to form a bank of rubber composition 4 continuously into a film or sheet 5, preferably, but not necessarily, of uniform thickness. The sheet 5 is severed by a plurality of knives 6, and, if desired, but not necessarily, is also marked by an indenting roller 7. In the drawings, only three cutting knives and one marker are illustrated, these being all that is required for superimposing one strip upon a second, but it is obvious that more knives may be employed for simultaneously carrying on two or more identical operations on one calender or tuber, or for superimposing more than one strip upon another. Tire treads may be plied or built up if desired in this manner.

Two severed strips are indicated at 8 and 9 in the drawings. One of these, 8, is conducted over a deflecting and guiding device, indicated generally by the numeral 10, and thereby deviated and superimposed upon the other strip, 9. To guide the operators in starting the operation, or in correcting alignment of the strips from time to time if occasion demands, the underlying strip 9 is preferably indented or marked, as indicated at 11. But, obviously, an edge guide might be employed for this purpose. The two strips come together or are superimposed, preferably adjacent the calender, before dust or particles in the air have a chance to collect on the surfaces of the strips, and hence, they adhere to one another tenaciously. The united or laminated stock may be passed around the lower calender roll 3 and removed in any manner convenient, for instance, with a liner on the wind-up reel 12, driven by traction from the lower calender roll 3, the supporting spindle 13 of the reel being free to move outward in the slotted guideways 14. Of course, however, the laminated strip may be carried to a cutter and divided into lengths or otherwise treated as desired.

The deflecting and guiding device 10 is preferably made in the form of a single roll, as shown in cross-section in Figure 3, but any other equivalent means may be employed, such as a bar or a plurality of bars or rolls. The preferred construction, however, is as illustrated and comprises a hollow roll whose surface is preferably dished slightly, as indicated at 15, the concavity being on a radius variable to meet the requirements of different stocks. In the instant case, the curvature is on a radius of around twenty inches for controlling a strip about six inches wide and onesixteenth of an inch thick. By hollowing out the surface of the roll, the strip is pulled upon oppositely on both sides of its center line, being thereby kept smooth and running in proper position on the roll.

Anti-friction devices 16 are preferably interposed between the roll and a supporting rod 17, having a bent end 18, which is adapted to be pulled upon by a threaded link 19, operating in an internally threaded collar 20, which is pinned to an angular abutment 21, having a yoke portion 22 which, by screws 23, is secured fast to a pin 24. The pin 24 passes through an aperture provided at the bend in the rod 17. The yoke 22, confines the bent rod 17 to movement in a plane. In this way, the roller may be adjusted in one plane.

For adjusting the roller in a plane perpendicular to the axis of the calender roll, the pin 24 is adjustably secured in an arm 26 collared to a fixed rod 27, a clamp screw 28 being provided for adjustment in any desired position.

The deflecting and guiding roll is preferably made adjustable, by some such means as those above described in detail, in planes perpendicular and also parallel to the axis of the calender rolls. But one or both of these adjustments may be omitted, as, for instance, when there is to be no provision made for handling strips of different widths.

The operation of the device will be clear from the detailed description above given. Further explanation would seem to be superfluous. It is to be understood that the invention is not limited to the precise procedure above detailed, and to the use of the specific apparatus above described in carrying on the process. And the apparatus may be varied widely without departing from the principles underlying the invention. For an understanding of the scope of the invention, reference should therefore be made to the accompanying claims.

Having thus described my invention, what I claim and desire to protect by Letters Patent is:—

1. An apparatus for laminating rubber comprising in combination a calender for continuously sheeting rubber composition, a plurality of knives for severing the sheet into strips, an obliquely disposed deflecting roll for shifting one of said strips longitudinally of the axis of one of the calendering rolls, said roll having a dished surface for stretching said strip oppositely from its center towards its margins.

2. A machine for manufacturing laminated strips of rubber, rubberized fabric and the like comprising, in combination: a calender for passing the rubber, rubberized fabric or the like in sheet form; cutting means juxtaposed to and cooperating with one of the calender rolls for cutting the sheet into strips, means for separating some of the strips from the calender roll with which the cutting means cooperates and for transposing said strips laterally with respect to the calender roll so as to position the transposed strips in superimposed relation with respect to the strips remaining on the calender, means including a calender roll for pressing the superimposed strips into contact whereby the strips are united to form a laminated strip.

3. A machine for manufacturing laminated strips of rubber, rubberized fabric and the like comprising in combination: a calender for passing the rubber, rubberized fabric or the like in sheet form; cutting means juxtaposed to and cooperating with one of the calender rolls for cutting the sheet into strips, a roller obliquely disposed with respect to the calender roll for separating some of the strips from the calender roll with which the cutting means cooperates and for transposing said strips laterally with respect to the calender roll so as to position the transposed strips in superimposed relation with respect to the strips remaining on the calender, means including a calender roll for pressing the superimposed strips into contact whereby the strips are united to form a laminated strip.

4. A machine for manufacturing laminated strips of rubber, rubberized fabric and the like comprising in combination: a calender for passing the rubber, rubberized fabric or the like in sheet form; cutting means juxtaposed to and cooperating with one of the calender rolls for cutting the sheet into strips, a roller obliquely disposed with respect to the calender roll for separating some of the strips from the calender roll with which the cutting means cooperates and for transposing said strips laterally with respect to the calender roll so as to position the transposed strips in superimposed relation with respect to the strips remaining on the calender, means including a calender roll for pressing the superimposed strips into contact whereby the strips are united to form a laminated strip, and means operated by the calender for rolling up the laminated strips as they leave the calender.

Signed at Indianapolis, county of Marion, and State of Indiana, this 13th day of February, 1924.

CHARLES L. FOUTZ.